United States Patent [19]
Martin

[11] Patent Number: 5,305,846
[45] Date of Patent: Apr. 26, 1994

[54] MOTORIZED TRACKBOARD

[76] Inventor: William D. Martin, 234 Magnolia St., Oviedo, Fla. 32765

[21] Appl. No.: 968,504

[22] Filed: Oct. 29, 1992

[51] Int. Cl.$^5$ ............................................. B62M 9/16
[52] U.S. Cl. .................................. 180/181; 180/9.23; 280/14.2
[58] Field of Search ............... 180/181, 184, 190, 191, 180/186, 9.23, 9.24, 9.25, 315, 180; 280/87.042, 14.2; 440/87, 95, 96, 97; 441/77; 305/35 EB

[56]  References Cited

U.S. PATENT DOCUMENTS

| | | | |
|---|---|---|---|
| 3,821,994 | 7/1974 | Bergius et al. | 180/190 |
| 3,828,872 | 8/1974 | Tsuchiya et al. | 180/190 |
| 4,094,372 | 6/1978 | Notter | 180/181 |
| 4,143,728 | 3/1979 | Shiber | 180/1 G |
| 4,151,892 | 5/1979 | Francken | 180/77 H |
| 4,600,073 | 7/1986 | Honett | 180/181 |
| 4,984,648 | 1/1991 | Strozok | 180/181 |
| 5,020,621 | 6/1991 | Martin | 180/181 |
| 5,090,716 | 2/1992 | Borden | 280/87.042 |
| 5,236,058 | 8/1993 | Yamet et al. | 180/181 |

FOREIGN PATENT DOCUMENTS

530131  12/1921  France .................. 180/181

Primary Examiner—Richard M. Camby
Attorney, Agent, or Firm—Edward M. Livingston

[57]  ABSTRACT

A motorized trackboard has a rear-mounted engine (4) which transmits rotary motion centrally to a rear-driven track (2) at each side of a trackboard platform (1). Different types of track, different types of gear means, different sizes and different human-factor accommodations are employed for different use-conditions. For some use-conditions, a rear track-drive wheel (3) is large and sturdy to support all weight on the trackboard for positioning weight on the rear to raise the front end for turning. A front track-support wheel (7) can be positioned higher than the axis of the rear drive wheel to provide a climbing incline (15). The front track-support wheel can be spring-tensioned in a forward direction to prevent track slack. It is an all-terrain vehicle that can be made small and light enough for child use or large enough for a seat for heavy use. A steering-track embodiment can be used for such applications as hunting, snow travel, beach travel, mountain travel, tending livestock, military travel, shopping and commuting. A dual embodiment has separate front and back sections joined pivotally for steering.

35 Claims, 5 Drawing Sheets

MOTORIZED TRACKBOARD

BACKGROUND OF THE INVENTION

This invention relates to motorized board-like platforms. More particularly this invention is a motorized trackboard having tracklaying wheels for all-terrain uses.

Motorized board-like platforms on which a person stands for recreational and other transportation uses are known in the prior art. None, however, are trackboards having motorized tracklaying wheels like this invention.

Examples of different tracklaying motorized boards known in the prior art include U.S. Pat. No. 4,984,648 issued to M. Strzok on Jan. 15, 1991. The Strzok patent taught a snow skiboard having a centrally-suspended track with drive bars that pivoted downwardly to engage snow when the skiboard was not being gravity-propelled. Weight of a user was supported by the snow skiboard instead of by a different form of track than taught by this invention. U.S. Pat. No. 4,600,073 issued to R. Honett on Jul. 15, 1986 taught a motorized platform having a curved-bottom endless belt with central drive wheels instead of the flat, rear-wheel-drive tracklaying trackboard taught by this invention.

All other known motorized platforms have employed wheels instead of track as a motive means. Examples of motorized platforms employing wheels as a motive means are motorized skateboards which include U.S. Pat. Nos. 5,020,621, 4,151,892 and 4,143,728 and others.

SUMMARY OF THE INVENTION

One object of this invention is to provide a motorized skateboard that can be operated on such surfaces as beach sands, desert sands, grass, separated-board platforms, cobblestone, pathways, sidewalks, roads, snow, ice, and most ground surfaces as an all-purpose class of vehicle.

Another object is to provide a sufficiently-light and portable vehicle that it can be hand-carried, belt carried or back-packed as desired.

Another object is to provide a sufficiently small vehicle that it can be carried in other vehicles such as cars, airplanes, campers and boats for use where such other vehicles cannot go.

Yet another object is to provide a sport vehicle which can be operated for pleasure and development of human motor skills.

This invention accomplishes the above and other objects with a trackboard having a rear-mounted engine which transmits rotary motion centrally to a rear-driven track at each side of the trackboard. Different types of track, different types of gear means, different sizes and different human-factor accommodations are employed for different use-conditions. For some use-conditions, a rear trackdrive wheel is large and sturdy to support all weight on the trackboard for positioning weight on the rear to raise the front end for turning. A front track-support wheel can be positioned higher than the axis of the drive wheel to provide a climbing incline. The front track-support wheel can be spring-tensioned in a forward direction to prevent track slack. It is an all-terrain vehicle that can be made small and light enough for child use or large enough for a seat for heavy use such as hunting, snow travel, mountain travel, beach travel, tending livestock, military uses, shopping and commuting. A dual embodiment has separate front and back sections joined pivotally for steering.

The above and other objects and advantages of the present invention will become more readily apparent when a preferred embodiment is discussed in conjunction with the drawings.

BRIEF DESCRIPTION OF THE DRAWINGS

This invention is described by appended claims in relation to description of a preferred embodiment with reference to the following drawings wherein:

DESCRIPTION OF THE PREFERRED EMBODIMENT

Figure 1:
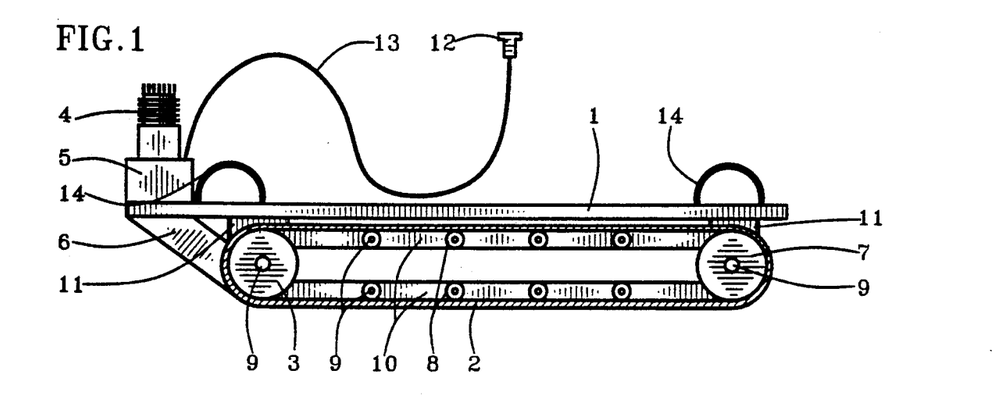
FIG. 1 is a side view of a relatively small size trackboard for use as a motorized skateboard.

Reference is made first to FIG. 1. A trackboard platform 1 has a track 2 driven by a track-drive wheel 3 that is rotated by a prime mover 4 with rotational power transmitted through a transmission 5 by gear means 6. The track 2 is suspended between the track-drive wheel 3 at the rear and a track-adjustment wheel 7 at the front of the trackboard platform 1 while resting on track-engagement wheels 8. Track 2 at opposite sides of the trackboard platform 1 is attached centrally between track axles 9 and track-axle framework 10 by central platform supports 11. The prime mover 4 can be controlled at a hand control 12 through a control cord 13 that is attached to the prime mover 4 and the control portions thereof. An individual can be supported on the trackboard platform 1 by means of foot straps 14 which are representative of user-support means generally.

Figure 2:
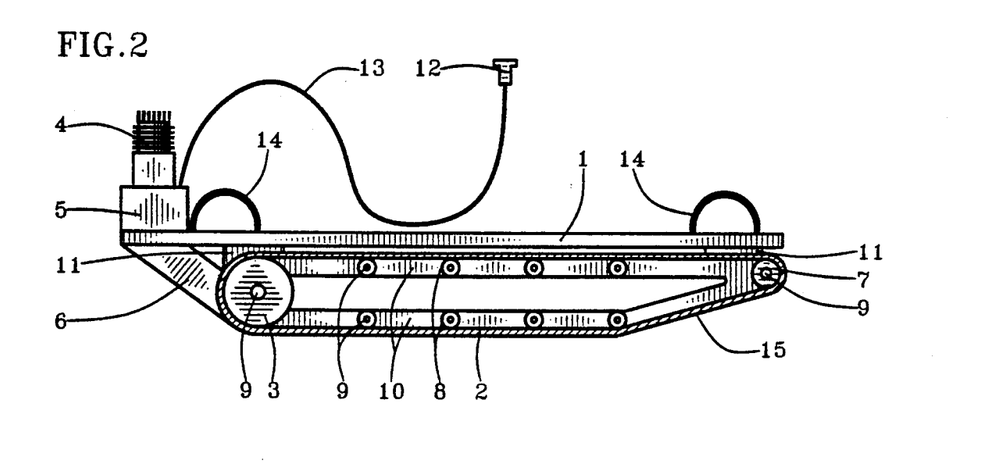
FIG. 2 is a side view of a skateboard embodiment with an inclined front.

Referring to FIG. 2, the track-adjustment wheel 7 can be smaller in diameter than the track-drive wheel 3 and have its track axle 9 positioned vertically higher than the axis of the track-drive wheel 3. This provides a climbing incline 15 at a bottom front end of the track-axle framework 10. The track-drive wheel 3 can be relatively large and sturdy to contain all weight on the trackboard platform 1 when the trackboard platform 1 may be tilted upwardly for some use conditions.

Figure 3:
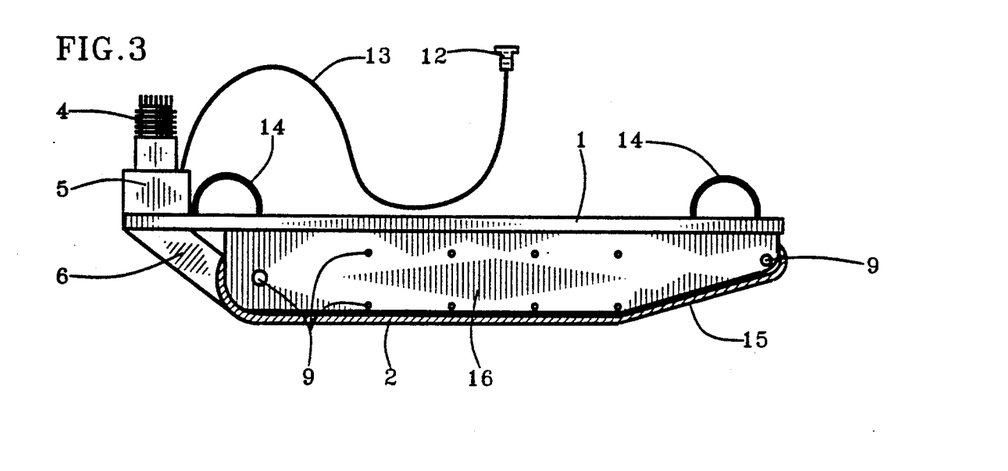
FIG. 3 is a side view of a skateboard embodiment with an inclined front and with side covers to which track wheels are attachable.

Referring to FIG. 3, a side-support frame 16 can be suspended downwardly from the trackboard platform 1. The track axles 9 can be attached rotationally to the side-support frame 16 which can be in the form of a cover at both sides of the track 2 on both sides of the trackboard platform 1.

Figure 4:
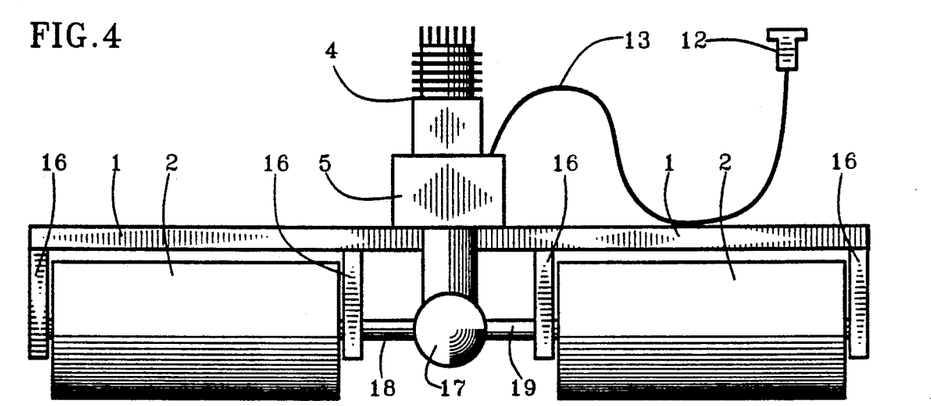
FIG. 4 is a rear view of a central gear-drive unit.

Referring to FIG. 4, a central transmission 17 can be employed to transmit rotary travel to opposite-side drive axles 18 and 19. Central drive is employed for embodiments of this invention which do not require separate rotational speeds of opposite drive axles 18 and 19. This central transmission 17 is representative of gear drives such as worm gears, helical gears and other types of gear and transmission means.

Figure 5:
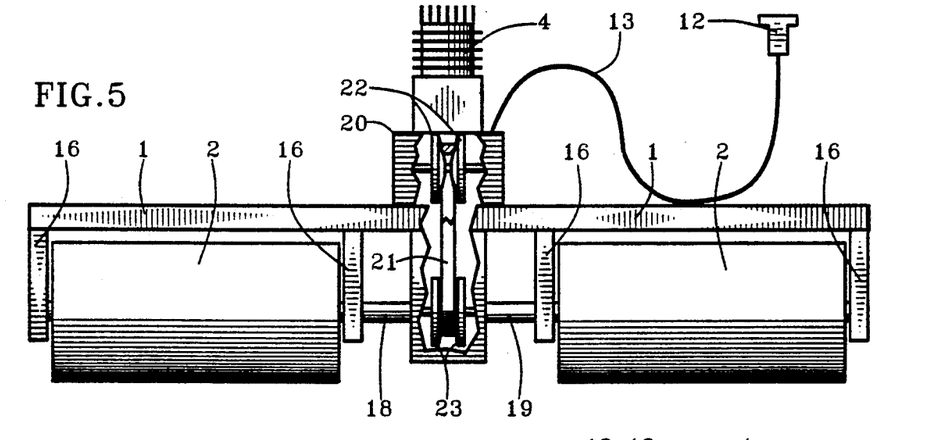
FIG. 5 is a cutaway rear view of a central gear-drive unit in which the gear drive is a sliding-V-belt reduction gear.

Referring to FIG. 5, the transmission 5 can be a sliding-V-belt reduction gear 20 with a V-belt 21 positional between a proximal sliding-V-belt wheel 22 and a distal sliding-V-belt wheel 2 in conventional V-belt relationship. This type of gearing provides both a clutch and transmission means. It has analog variability of gear ratio. Its wear life can be sufficient for the purposes of this invention. Although relatively large, it is relatively light in comparison to other gear and transmission means that can be employed.

Figure 6:
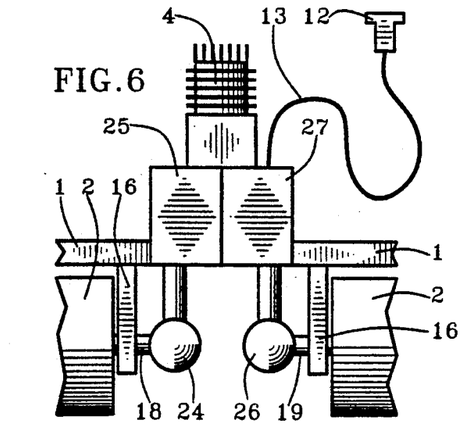
FIG. 6 is a sectional view of opposite-side drive gears having independently-controllable drive gears.

Referring to FIG. 6, left gearing 24 can transmit rotary motion from a left transmission 25 to left drive axle 18 and right gearing 26 can transmit rotary motion from a right transmission 27 to right drive axle 19 separately. Regardless of what type of gearing 24 and 26 and transmissions 25 and 27 are employed, a turning effect can be achieved with standard tracklaying-vehicle methods by variation of rotational speed imparted to axles 18 and 19. The hand control 12 can be provided with a torque-resistant cable or other control means for controlling speed of the axles 18 and 19 separately.

Figure 7:
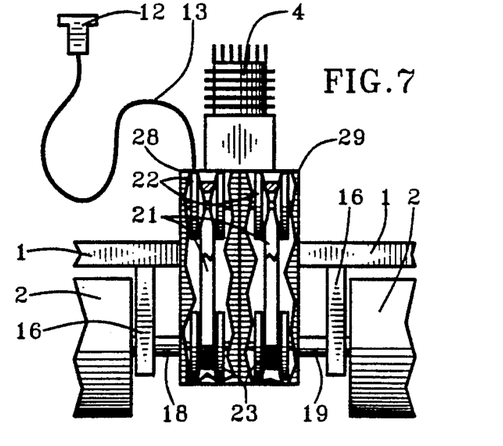
FIG. 7 is a sectional cutaway view of opposite-side drive gears having independently-controllable drive gears which are sliding-V-belt reduction gears.

Referring to FIG. 7, a left V-belt reduction gear 28 and a right V-belt reduction gear 29 can be a gear and a transmission means employed to transmit rotary motion separately and controllably to axles 18 and 19. The components would be functionally the same as described in relation to FIG. 5.

Figure 8:
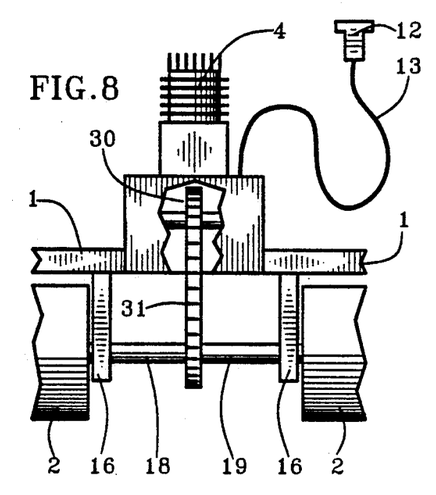
FIG. 8 is a sectional cutaway view of central chain-drive gear track-drive wheels on both sides of a trackboard.

Referring to FIG. 8, a sprocket-drive gear 30 can be employed to transmit rotary motion with a sprocket chain 1 to axles 18 and 19. This is an effective transmission means but is subject to problems from sand-induced wear and distortion in some intended use-conditions.

Figure 9:
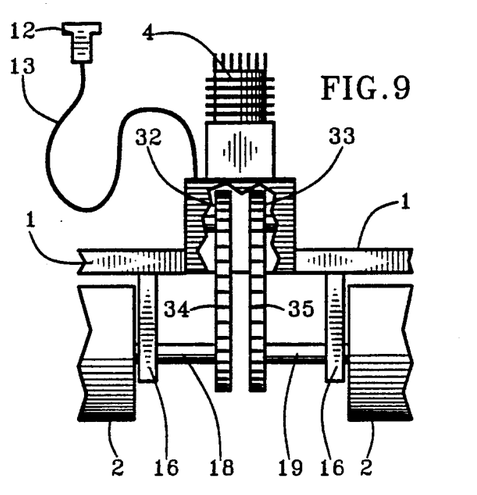
FIG. 9 is a sectional cutaway view of independently-controllable chain drives for opposite-side track-drive wheels.

Referring to FIG. 9, a left sprocket gear 2 and a right sprocket gear can be employed to transmit rotary motion to left drive axle 18 and right drive axle 19 through left sprocket chain 4 and right sprocket chain 35, respectively. Standard track-vehicle steering and control can be achieved with this mechanism also.

Figure 10:
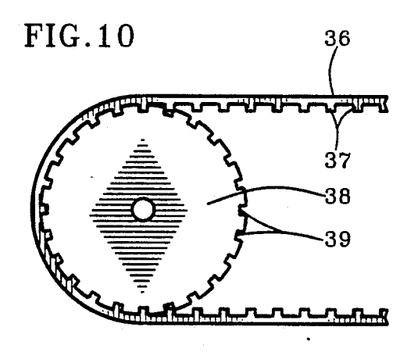
FIG. 10 is a sectional view of a gear-belt track in relation to a gear-belt drive wheel.

Referring to FIG. 10, the track 2 described in relation to FIG. 1 and referenced generally in following figures can be a gear belt 36 with gear-belt teeth 37. The track-drive wheel 3 described above would be a gear-belt wheel 38 with gear-belt grooves 39 to mesh with the gear-belt teeth 37. Typically, gear belts are a fibrous material that is flexible but not stretchable within design limits. Gear belts also can be coated with resilient material such as rubber. Such coating is highly advantageous for most use conditions of this invention. The outside of the gear belt 36 opposite the teeth can be smooth for some use conditions where sliding is desired as described below.

Figure 11:
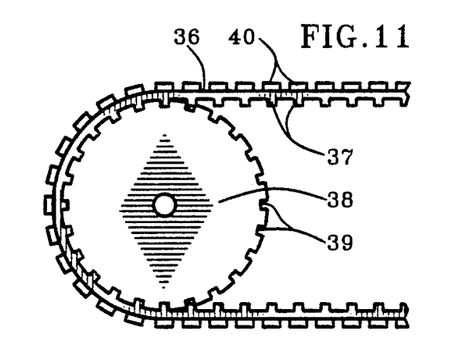
FIG. 11 is a sectional view of a gear-belt track having resilient cleats on an opposite side of a gear belt from teeth of a gear belt.

Referring to FIG. 11, gear-belt cleats 40 can be positioned on gear belt 36. It is preferable that positioning of the gear-belt cleats 40 be opposite each gear-belt tooth 37. It is standard practice in gear-belt technology to position gear-belt teeth opposite each other for some opposite-side-gearing use-conditions. In this case, however, it is desirable, although not necessary, that the gear-belt cleats 40 be selectively wider than the gear-belt teeth 37 as illustrated. Resilience of gear belts and, to a lesser extent, resilience of gear-belt wheels generally provides longer use-life in most use-conditions for this invention. A suitably-rubberized coating can make this type of track competitive in use-life with rubber tires.

Figure 12:
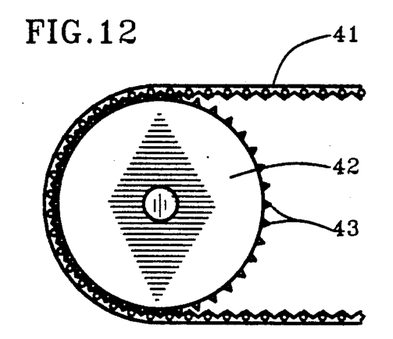
FIG. 12 is a sectional view of a chain-link track.

Referring to FIG. 12, standard metal track 41 can be employed on a metal-track drive wheel 42 having track-drive serrations 43.

Figure 13:
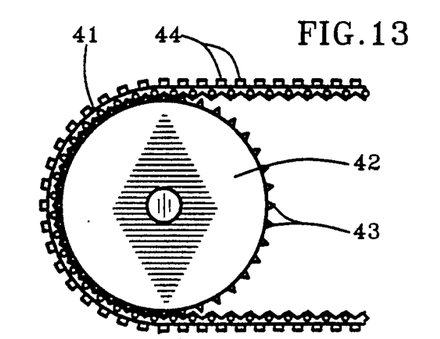
FIG. 13 is a sectional view of a chain-link track having cleats on chain-link sections.

Referring to FIG. 13, metal-track cleats 44 can be positioned on an outside of the metal track 41. The metal-track cleats 44 can be either metallic or a resilient material such as rubber or a rubber-like material.

Figure 14:
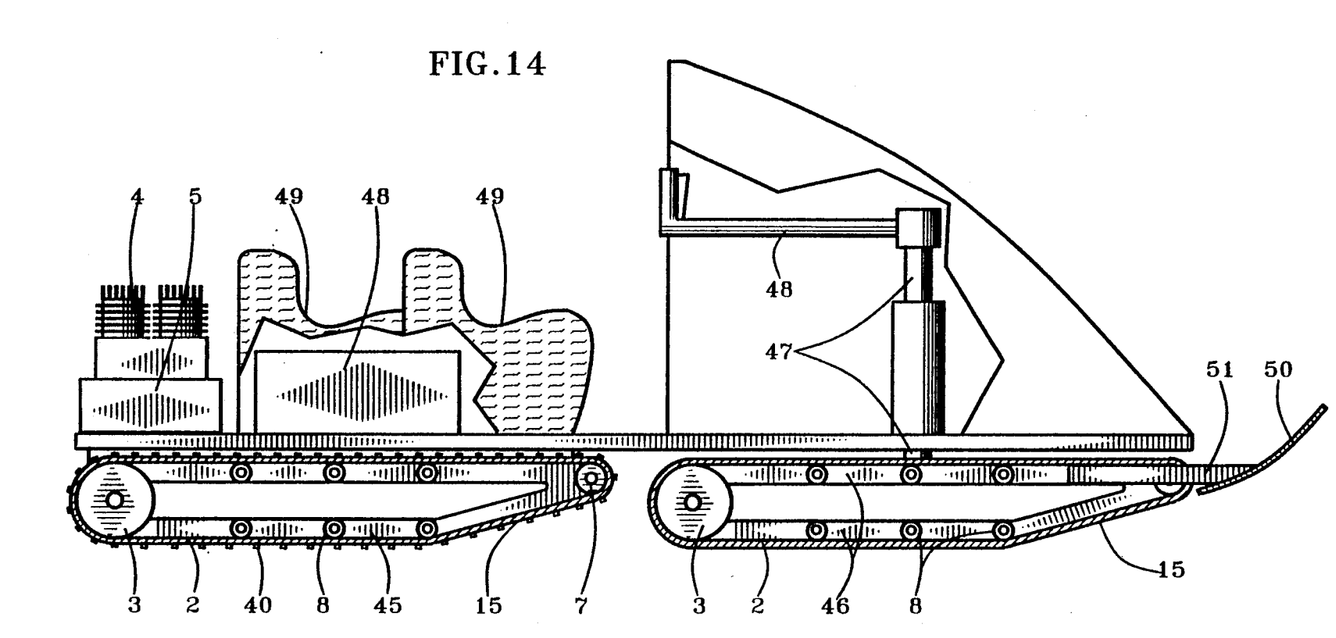
FIG. 14 is a cutaway side view of a steering-track embodiment of this invention.
Figure 15:
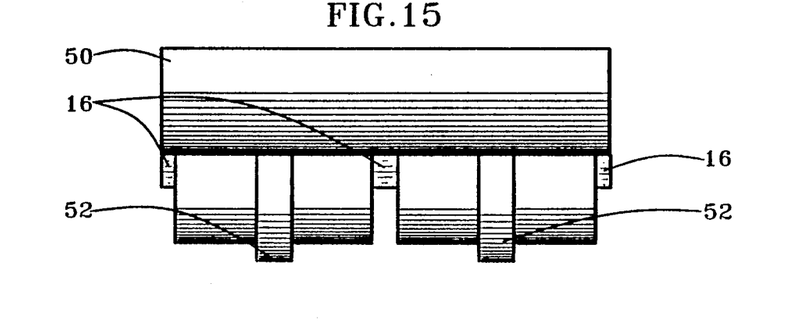
FIG. 15 is a sectional front view of a steering track with an attachable skirunner for the FIG. 14 illustration.

Referring to FIGS. 14 and 15, a trackboard platform 1 can have a rear track frame 45 and a steering track frame 46. The rear track 2 would be substantially the same as described above in relation to FIGS. 1-3. The trackboard platform 1 is elongated or extended selectively for pivotal attachment of the steering track frame 46. The steering frame 46 is pivotal on steering axle 47 with steering handle or handlebars 48 for front-track steering of the trackboard platform 1. The steering axle 47 can be positioned slightly ahead of center of the steering track frame 46 to cause a self-centering effect on the steering mechanism. Alternatively, this embodiment of the invention can be relatively large or small. When relatively large, the prime mover 4 can be larger and a fuel tank 48 can be positioned near the prime mover with a seat 49, preferably a motorcycle type of seat, swivelably positioned above the fuel tank 48. The prime mover 4 can be positioned slightly forward of the track-drive wheel 3. It is preferable for this embodiment that track 2 on the rear track frame 45 have cleats 40, representative of any type of cleat, but that track 2 on steering track frame 46 be smooth. Track 2 on the rear track frame 45 is powered and track 2 on steering track frame 46 is free-turning or free-sliding, depending on the type of terrain encountered.

This embodiment can be used intermittently on either low-friction surfaces such as snow and on high-friction surfaces such as ground or pavement. For use on snow, a ski-front runner 50 can be attachable to the steering track frame 46 with runner-attachment appendages 51. One or more steering ridges 52 can be positioned on the outside periphery of the track 2 on the steering track frame 46. The freely-turning or freely-sliding characteristics of the steering portion of this embodiment provide a higher lever all-terrain capability than has been known previously. Although largely intended for recreational purposes, this embodiment has large-scale military and other utilitarian applications.

Figure 16:
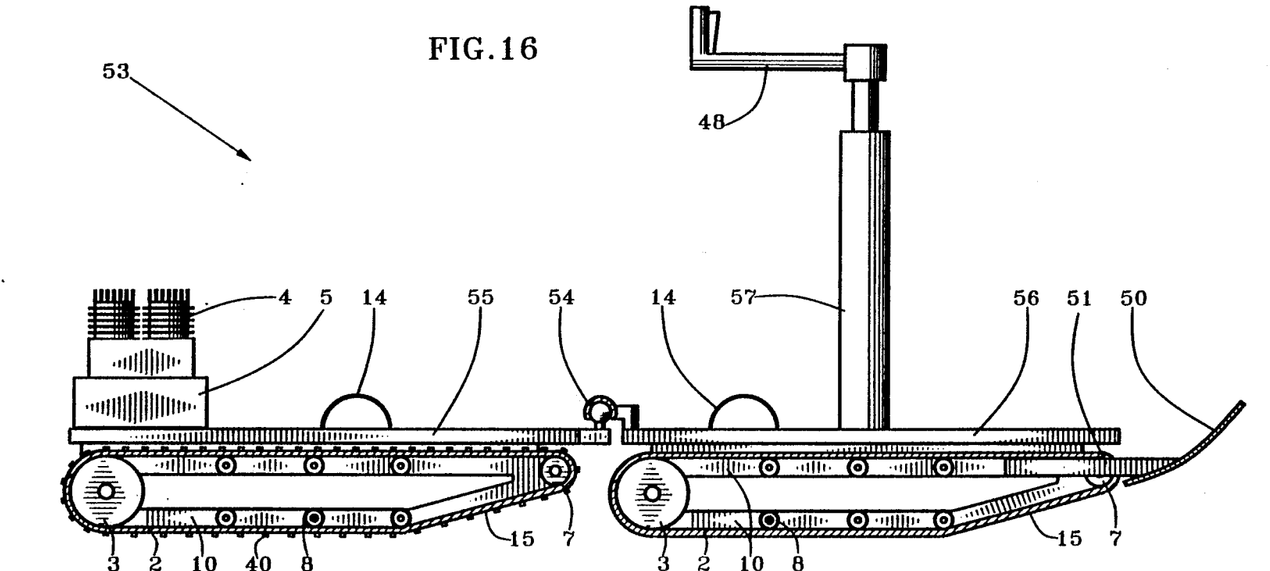
FIG. 16 is a side view of an embodiment having an attachable steering trackboard.

Referring to FIG. 16, a dual-platform embodiment 53 can be provided with swivel connection 54 of a rear trackboard platform 55 to a front trackboard platform 56. Steering means 48 is attached to a steering column 57 with which the entire front trackboard platform 56 is pivotal for steering this embodiment 53.

Figure 17:
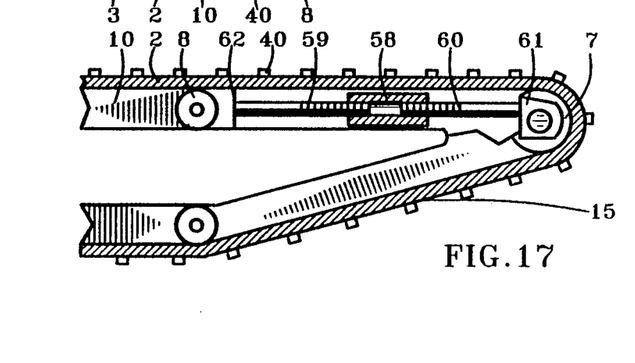
FIG. 17 is a sectional cutaway side view of an oppositely-threaded track-slack-adjustment means.

Reference is made to FIG. 17 primarily and to FIGS. 1-3, 14, 16 and 18 secondarily. On the track-axle framework 10, 45 or 46, the track-adjustment wheel 7 can be positional ahead tightly for track-slack adjustment by rotating selectively an adjustment sleeve 58 having oppositely-threaded ends into which a base rod 59 and an adjustment rod 60 are threaded. The adjustment rod 60 is buttressed against an adjustment-axle housing 61, such that rotation of adjustment sleeve 58 in one direction increases distance between the adjustment-axle housing 61 and a frame base 62 to tighten track 2 on framework 10, 45 or 46. Rotating the adjustment sleeve 58 in an opposite direction loosens track 2.

Figure 18:
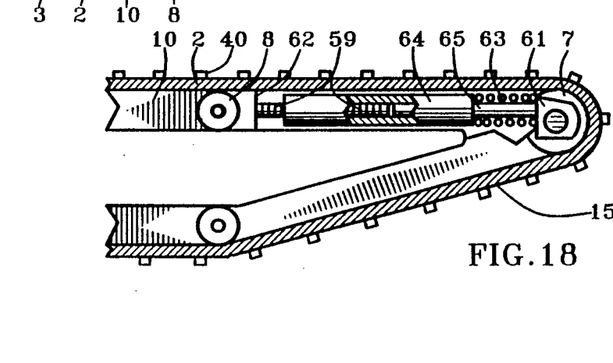
FIG. 18 is a sectional cutaway side view of an adjustable-spring track-slack-adjustment means.

Referring to FIG. 18, a track-slack-adjustment spring 63 can be positioned between the adjustment-axle housing 61 and a spring-base sleeve 64 to provide spring-tension slack adjustment of track 2 on framework 10, 45 or 46. The spring-base sleeve 64 is threaded in only a base end into which a threaded base rod 59 is inserted. Through a spring end of the spring-base sleeve 64, a spring-guide rod 65 slides freely as a guide for the track-slack-adjustment spring 63.

A new and useful motorized trackboard having been described, all such modifications, adaptations, substitutions of equivalents, combinations of components, applications and forms thereof as described by the following claims are included in this invention.

I claim:

1. A trackboard comprising:
    a trackboard platform;
    an endless-belt track mounted on track-engagement wheels on each side of a bottom surface of the trackboard platform;
    a track-drive wheel in rotationally track-engagement relationship with the endless-belt track at each side of a rear portion of the bottom surface of the trackboard platform in a common axis;
    a prime mover positional on a rear portion of the trackboard platform;
    a rotational-drive means in rotational-drive relationship between the prime mover and the track-drive wheel;
    a track-adjustment wheel in track-engagement relationship with a front portion of each endless-belt track in a common axis at each side of a front portion of the bottom surface of the trackboard platform; and
    a base-length-adjustment means attached rotationally to an axle of the track-adjustment wheel and attached to the trackboard platform in base-length-adjustment communication between the track-adjustment wheel and the front portion of the trackboard platform.

2. A trackboard according to claim 1 wherein the track-drive wheel is relatively large and sturdy such that it can made to support weight of the trackboard and weight normally placed on the trackboard without aid of other track-engagement wheels when the trackboard is tilted rearwardly.

3. A trackboard according to claim 1 wherein the base-length-adjustment means is spring-tensioned member in expansive-tension relationship between an adjustment base on the trackboard and the axle of the track-adjustment wheel.

4. A trackboard according to claim 1 wherein the endless-belt track on each side of the bottom surface of the trackboard platform is a gear belt.

5. A trackboard according to claim 4 and further comprising:
    resilient cleats extended from gear belt at positions proximate extension of gear-belt teeth from an opposite side of each gear belt.

6. A trackboard according to claim 1 wherein the endless-belt track on each side of the bottom surface of the trackboard platform is linked metallic track.

7. A trackboard according to claim 6 and further comprising:
    resilient cleats extended from each link of the linked metallic track.

8. A trackboard according to claim 1 wherein the rotational-drive means is positioned between the track-drive wheels at each side of a rear portion of the bottom surface of the trackboard platform.

9. A trackboard according to claim 1 wherein the rotational-drive means is a V-belt drive.

10. A trackboard according to claim 1 wherein the rotational-drive means is a gear-belt drive.

11. A trackboard according to claim 1 wherein the rotational-drive means is a chain-and-sprocket drive.

12. A trackboard according to claim 1 wherein the rotational-drive means is a worm-drive gear.

13. A trackboard according to claim 1 and further comprising:
    a selectively-geared rotational-power-transmission means in rotational-power-transmission relationship between the prime mover and the rotational drive means.

14. A trackboard according to claim 13 wherein the selectively-geared rotational-power-transmission means is a sliding-V-belt reduction gear.

15. A trackboard according to claim 1 wherein the track-adjustment wheel is relatively small in proportion to the track-drive wheel and the axis of the track-adjustment wheel is positioned vertically higher than the axis of the track-drive wheel such that a climbing track surface is formed between the track-adjustment wheel and a track-engagement wheel aft of the track-adjustment wheel.

16. A trackboard according to claim 1 and further comprising:
    a user-support means on the trackboard platform.

17. A trackboard according to claim 16 wherein the user-support means is a foot housing.

18. A trackboard according to claim 16 wherein the user-support means is a motorcycle type seat attachable to the trackboard platform.

19. A trackboard according to claim 17 and further comprising:
    a motorcycle type of seat attachable to the top of the trackboard platform.

20. A trackboard according to claim 1 and further comprising:
    a prime-mover-control means extended from the prime mover to a position accessible to a user on the trackboard.

21. A trackboard according to claim 1 wherein the track-drive wheel is relatively large and sturdy such that it can made to support weight of the trackboard and weight normally placed on the trackboard without aid of other track-engagement wheels when the trackboard is tilted rearwardly;

the endless-belt track on each side of the bottom surface of the trackboard platform is a gear belt;

resilient cleats extended from each gear belt at positions proximate extension of gear-belt teeth from an opposite side of each gear belt;

the rotational-drive means is positioned between the track-drive wheels at each side of a rear portion of the bottom surface of the trackboard platform;

a selectively-geared rotational-power-transmission means in rotational-power-transmission relationship between the prime mover and the rotational drive means;

the track-adjustment wheel is relatively small in proportion to the track-drive wheel and the axis of the track-adjustment wheel is positioned vertically higher than the axis of the track-drive wheel such that a climbing track surface is formed between the track-adjustment wheel and a track-engagement wheel aft of the track-adjustment wheel;

a user-support means on the trackboard platform; and a prime-mover-control means extended from the prime mover to a position accessible to a user on the trackboard.

22. A trackboard according to claim 1 wherein the rotational-drive means is in rotational-drive relationship between the prime mover and the track-drive wheel separately at each side of a rear portion of the bottom surface of the trackboard platform by means of an independently-controllable transmission means.

23. A trackboard according to claim 22 wherein the independently-controllable transmission means is a sliding-V-belt reduction gear.

24. A trackboard comprising:

a trackboard platform;

a rear endless-belt track mounted on track-engagement wheels on each side of a rear portion of the bottom surface of the trackboard platform;

a track-drive wheel in rotationally track-engagement relationship with the rear endless-belt track at each side of a rear portion of the bottom surface of the trackboard platform in a common axis;

a prime mover positional on a rear portion of the trackboard platform;

a rotational-drive means in rotational-drive relationship between the prime mover and the track-drive wheel;

a track-adjustment wheel in track-engagement relationship with a front portion of each endless-belt track in a common axis at each side of a mid portion of the bottom surface of the trackboard platform;

a base-length-adjustment means attached rotationally to an axle of the track-adjustment wheel and attached to the trackboard platform in base-length-adjustment communication between the track-adjustment wheel and the mid portion of the trackboard platform, wherein the rotational-drive means is positioned between the track-drive wheels at each side of a rear portion of the bottom surface of the trackboard platform;

a selectively-geared rotational-power-transmission means in rotational-power-transmission relationship between the prime mover and the rotational drive means;

a user-support means on the trackboard platform;

a prime-mover-control means extended from the prime mover to a position accessible to a user on the trackboard;

a steering endless-belt track mounted on track-engagement wheels on each side of a bottom surface of a steering trackboard pivotally attached to a forward portion of the trackboard platform;

a steering track-adjustment wheel in track-engagement relationship with a front portion of each endless-belt track in a common axis at each side of a front portion of the bottom surface of the steering trackboard;

a steering base-length-adjustment means attached rotationally to an axle of the steering track-adjustment wheel and attached to the steering trackboard in base-length-adjustment communication between the steering track-adjustment wheel and the front portion of the steering trackboard, wherein the steering track-adjustment wheel is relatively small in proportion to a rear track-engagement wheel on the steering trackboard and the axis of the steering track-adjustment wheel is positioned vertically higher than the axis of the rear track-engagement wheel on the steering trackboard such that a climbing track surface is formed between the steering track-adjustment wheel and a track-engagement wheel aft of the steering track-adjustment wheel;

a user-support means on the trackboard platform;

a steering member attached to the steering trackboard and extended to a position in front of the user-support means; and prime-mover-control means extended from the prime mover to a position accessible to a user on the trackboard platform.

25. A trackboard according to claim 24 wherein the endless-belt track on each side of the bottom surface of the trackboard platform is a gear belt.

26. A trackboard according to claim 25 and further comprising:

resilient cleats extended from each gear belt at positions proximate extension of gear-belt teeth from an opposite side of each gear belt;

27. A trackboard according to claim 24 wherein the steering endless-belt track has a smooth outside surface such that the steering endless-belt track can slide on low-friction surfaces such as snow and ice and can turn on variously high-friction surfaces such as comprise most other operating surfaces.

28. A trackboard according to claim 27 and further comprising:

an upwardly-beveled steering runner attachable to sides of the steering trackboard and extended from side-to-side of the steering platform at a position in front of the trackboard platform to which the steering trackboard is attached pivotally.

29. A trackboard according to claim 27 and further comprising:

at least one track steering ridge extended from an outside periphery of each steering endless-belt track, the track steering ridges being flexible with the respective steering endless-belt tracks from which they are extended.

30. A trackboard comprising:

a rear trackboard platform;

a rear endless-belt track mounted on track-engagement wheels on each side of a rear portion of the bottom surface of the rear trackboard platform;

a track-drive wheel in rotationally track-engagement relationship with the rear endless-belt track at each side of a rear portion of the bottom surface of the rear trackboard platform in a common axis;

a prime mover positional on a rear portion of the rear trackboard platform;

a rotational-drive means in rotational-drive relationship between the prime mover and the track-drive wheel;

a rear track-adjustment wheel in track-engagement relationship with a front portion of each endless-belt track at each side of a front portion of the bottom surface of the rear trackboard platform in a common axis;

a rear base-length-adjustment means attached rotationally to an axle of the track-adjustment wheel and attached to the rear trackboard platform in base-length-adjustment communication between the rear track-adjustment wheel and the front portion of the rear trackboard platform, wherein the rotational-drive means is positioned between the track-drive wheels at each side of a rear portion of the bottom surface of the rear trackboard platform;

a selectively-geared rotational-power-transmission means in rotational-power-transmission relationship between the prime mover and the rotational drive means;

a user-support means on the rear trackboard platform;

a prime-mover-control means extended from the prime mover to a position accessible to a user on the rear trackboard platform;

a front trackboard platform having a rear end of the front trackboard platform attached pivotally to the front end of the rear trackboard platform;

a steering endless-belt track mounted on track-engagement wheels on each side of a bottom surface of the front trackboard platform;

a steering track-adjustment wheel in track-engagement relationship with a front portion of each endless-belt track at each side of a front portion of the bottom surface of the front trackboard platform in a common axis;

a steering base-length-adjustment means attached rotationally to an axle of the steering track-adjustment wheel and attached to the front trackboard platform in base-length-adjustment communication between the steering track-adjustment wheel and the front portion of the front trackboard platform, wherein the steering track-adjustment wheel is relatively small in proportion to a rear track-engagement wheel on the front trackboard platform and the axis of the steering track-adjustment wheel is positioned vertically higher than the axis of the rear track-engagement wheel on the steering trackboard such that a climbing track surface is formed between the steering track-board wheel and a track-engagement wheel aft of the steering track-adjustment wheel; and a user-support means on the front trackboard platform.

31. A trackboard according to claim 30 wherein the endless-belt track on each side of the bottom surface of the rear trackboard platform is a gear belt.

32. A trackboard according to claim 31 and further comprising:

resilient cleats extended from each gear belt at positions proximate extension of gear-belt teeth from an opposite side of each gear belt;

33. A trackboard according to claim 30 wherein the steering endless-belt track has a smooth outside surface such that the steering endless-belt track can slide on low-friction surfaces such as snow and ice and can turn on variously high-friction surfaces such as comprise most other operating surfaces.

34. A trackboard according to claim 33 and further comprising:

an upwardly-beveled steering runner attachable to sides of the front trackboard platform.

35. A trackboard according to claim 29 and further comprising:

at least one track steering ridge extended from an outside periphery of each steering endless-belt track, the track steering ridges being flexible with the respective steering endless-belt tracks from which they are extended.

* * * * *